United States Patent
Wang et al.

(10) Patent No.: US 12,037,031 B2
(45) Date of Patent: Jul. 16, 2024

(54) TRAIN NETWORK CONTROL SYSTEM INCLUDING REDUNDANT NETWORK STRUCTURE, METHOD AND DEVICE AND TRAIN

(71) Applicant: CRRC QINGDAO SIFANG CO., LTD., Shandong (CN)

(72) Inventors: Xiang Wang, Shandong (CN); Han Liu, Shandong (CN); Li Wang, Shandong (CN); Baiqing Wang, Shandong (CN); Guoyi Yang, Shandong (CN); Guangmao Wang, Shandong (CN)

(73) Assignee: CRRC QINGDAO SIFANG CO., LTD, Shandong (CN)

( * ) Notice: Subject to any disclaimer, the term of this patent is extended or adjusted under 35 U.S.C. 154(b) by 401 days.

(21) Appl. No.: 17/424,502

(22) PCT Filed: Oct. 29, 2019

(86) PCT No.: PCT/CN2019/113919
§ 371 (c)(1),
(2) Date: Jul. 21, 2021

(87) PCT Pub. No.: WO2020/168739
PCT Pub. Date: Aug. 27, 2020

(65) Prior Publication Data
US 2022/0073114 A1    Mar. 10, 2022

(30) Foreign Application Priority Data
Feb. 22, 2019   (CN) .......................... 201910132635.X

(51) Int. Cl.
*B61L 15/00*   (2006.01)
*H04L 12/40*   (2006.01)

(52) U.S. Cl.
CPC ....... *B61L 15/0036* (2013.01); *B61L 15/0063* (2013.01); *H04L 12/40032* (2013.01);
(Continued)

(58) Field of Classification Search
CPC ........................ B61L 15/0063; B61L 15/0036
See application file for complete search history.

(56) References Cited

U.S. PATENT DOCUMENTS

2007/0249286 A1* 10/2007 Ma ........................ H04W 12/50
                                                                455/507
2014/0059534 A1*  2/2014 Daum ...................... G06F 8/65
                                                                717/172
(Continued)

FOREIGN PATENT DOCUMENTS

CN        201193040 Y       2/2009
CN        105099842 A       11/2015
(Continued)

OTHER PUBLICATIONS

International Search Report for PCT/CN2019/113919 mailed Jan. 16, 2020, ISA/CN.
(Continued)

*Primary Examiner* — Jess Whittington
(74) *Attorney, Agent, or Firm* — Yue (Robert) Xu; Apex Attorneys at Law, LLP

(57) ABSTRACT

A train network control system, method and device and a train. The system comprises at least two power units. The power units in the at least two power units carry out data interaction by means of a backbone Ethernet or a hinged train bus, respectively. According to the train network control system, method and device and the train provided by the embodiments of the present invention, the backbone Ethernet and the hinged train bus form a redundant network
(Continued)

structure, so that the communication stability and reliability among the power units in the train are enhanced.

6 Claims, 3 Drawing Sheets

(52) U.S. Cl.
CPC ............... *H04L 12/40045* (2013.01); *H04L 2012/40293* (2013.01)

(56) References Cited

U.S. PATENT DOCUMENTS

| | | | | |
|---|---|---|---|---|
| 2014/0129061 | A1* | 5/2014 | Cooper | H04L 63/00 701/19 |
| 2015/0215392 | A1* | 7/2015 | Miebs | H04L 41/0806 709/201 |
| 2019/0034291 | A1* | 1/2019 | Bandekar | G06F 11/2048 |
| 2020/0139995 | A1* | 5/2020 | Loch | H04L 63/18 |
| 2021/0078620 | A1* | 3/2021 | Kanner | B61L 15/0063 |
| 2022/0007186 | A1* | 1/2022 | Loch | B61L 15/0036 |

FOREIGN PATENT DOCUMENTS

| | | |
|---|---|---|
| CN | 105262651 A | 1/2016 |
| CN | 105438222 A | 3/2016 |
| CN | 106004929 A | 10/2016 |
| CN | 106240601 A | 12/2016 |
| CN | 108521361 A | 9/2018 |
| CN | 108667703 A | 10/2018 |
| CN | 208273021 U | 12/2018 |
| CN | 109889383 A | 6/2019 |
| EP | 3124331 A1 | 2/2017 |
| JP | 2001060959 A | 3/2001 |

OTHER PUBLICATIONS

First Office Action dated Aug. 10, 2022 for Japanese patent application No. 2021-541544, English translation provided by Global Dossier.

* cited by examiner

TRAIN NETWORK CONTROL SYSTEM INCLUDING REDUNDANT NETWORK STRUCTURE, METHOD AND DEVICE AND TRAIN

CROSS REFERENCE OF RELATED APPLICATION

The present disclosure is a National Stage application of PCT international application PCT/CN2019/113919, filed on Oct. 29, 2019, which claims the priority to Chinese Patent Application No. 201910132635.X, titled "TRAIN NETWORK CONTROL SYSTEM, METHOD AND DEVICE AND TRAIN", filed on Feb. 22, 2019 with the Chinese State Intellectual Property Office, the content of which is incorporated herein by reference.

FIELD

The present disclosure relates to the technology field of rail vehicles, and particularly, to a train network control system, method and device, and a train.

BACKGROUND

At present, a train communication network (TCN) is set on a train, and power units of the train can interact through the TCN.

When the TCN fails and cannot work, the power units cannot communicate with each other, therefore electrical equipment on the train cannot operate normally.

SUMMARY

To solve the above problems, a train network control system, method and device, and a train are provided according to embodiments of the present disclosure.

According to an embodiment of the present disclosure, a train network control system is provided, where the train network control system includes at least two power units, data interaction is performed between power units of the at least two power units through a backbone Ethernet or a wired train bus.

According to an embodiment of the present disclosure, a train including the aforementioned train network control system is provided.

According to an embodiment of the present disclosure, a train network control method, applied to the aforementioned train network control system, is provided, where the method includes:
  obtaining, by a power unit, address information of another power unit;
  sending, based on the address information, a control instruction to the power unit corresponding to the address information through the backbone Ethernet; and
  in a case of not receiving feedback information from the power unit corresponding to the address information within a preset time, sending a control instruction to the another power unit through the wired train bus.

According to an embodiment of the present disclosure, a train network control method, applied to the aforementioned train network control system, is provided, where the method includes:
  sending, by a central control unit of a current power unit, a control instruction to a controlled device of the first power unit through a marshaling Ethernet; and
  in a case of not receiving feedback information from the controlled device within a preset time, sending a control instruction to the controlled device through a multi-function vehicle bus.

According to an embodiment of the present disclosure, a train network control device is provided, including:
  an acquisition module, configured to obtain address information of an another power unit;
  a first sending module, configured to send, based on the address information, a control instruction to the power unit corresponding to the address information through a backbone Ethernet; and
  a second sending module, configured to, in a case of not receiving feedback information from the power unit corresponding to the address information within a preset time, send a control instruction to the another power unit through a wired train bus.

According to an embodiment of the present disclosure, a train network control device is provided, including:
  a first sending unit, configured to send a control instruction to a controlled device through a marshaling Ethernet; and
  a second sending unit, configured to, in a case of not receiving feedback information from the controlled device within a preset time, send a control instruction to the controlled device through a multi-function vehicle bus.

According to the solutions provided by the first and second aspects of the present disclosure, a backbone Ethernet and a wired train bus are provided on a train, and data interaction between the power units of the train can be performed through the backbone Ethernet and the wired train bus. In the conventional technology, central control units of power units cannot communicate with each other when the train communication network of the train fails. However, in the present solutions, the central control units of the power units can communicate with each other through the wired train bus when the backbone Ethernet fails, and the central control units of the power units can communicate with each other through the backbone Ethernet when the wired train bus fails. The backbone Ethernet and the wired train bus form a redundant network structure, thereby enhancing stability and reliability of communication between the power units of the train.

According to the solutions provided by the third and fifth aspects of the present disclosure, a control instruction is sent to a power unit corresponding to the address information through the backbone Ethernet. If feedback information is not received within a preset time, a control instruction is sent to the power unit through the wired train bus. In this way, when the backbone Ethernet fails, the data transmission network is switched to be the wired train bus. By using the wired train bus to send the control instruction, it is ensured that each power unit on the train can operate normally, thereby enhancing stability and reliability of communication between the power units of the train.

According to the solutions provided by the fourth and sixth aspects of the present disclosure, a control instruction is sent to a controlled device through a marshaling Ethernet. If feedback information is not received within a preset time, the control instruction is sent to the controlled device through a multi-function vehicle bus. In this way, when the marshaling Ethernet fails, the data transmission network is switched to be the multi-function vehicle bus. By using the multi-function vehicle bus to send the control instruction, it is ensured that the controlled device in the power unit on the train can operate normally, thereby enhancing stability and reliability of communication between the power units of the train.

In order to make the foregoing objects, features, and advantages of the present disclosure more comprehensible, hereinafter are specific embodiments described in detail with reference to the drawings.

Figure 1:
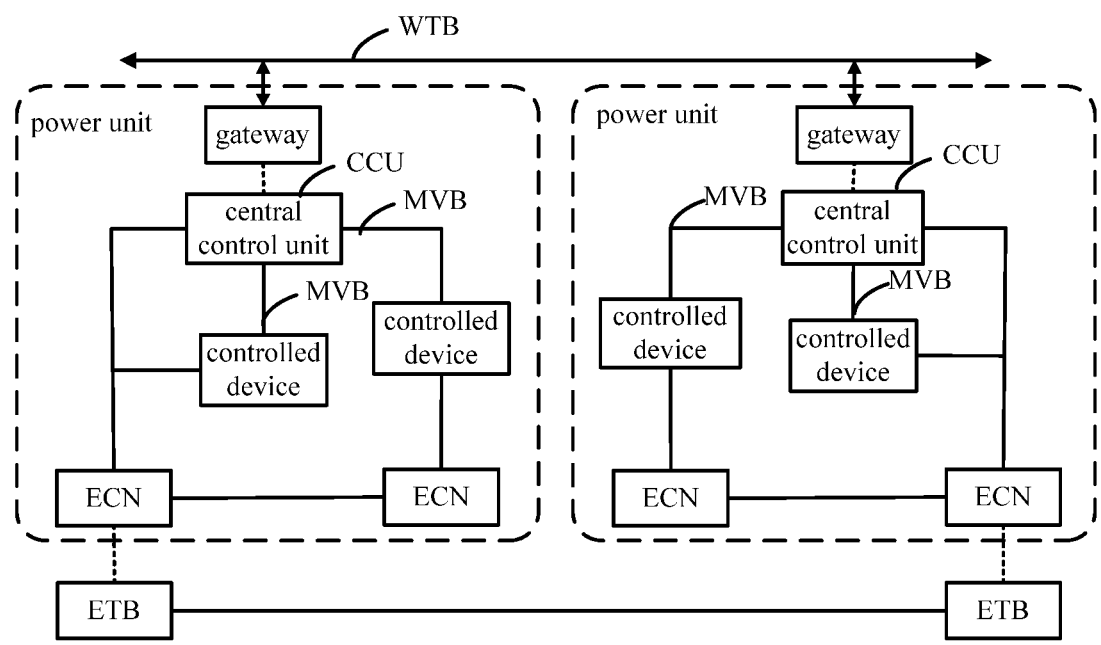
FIG. 1 is a schematic structural diagram of a train network control system according to embodiment one of the present disclosure.

| Numerals: | |
|---|---|
| ECN: marshaling Ethernet | WTB: wired train bus |
| MVB: multi-function vehicle bus | CCU: central control unit |
| ETB: backbone Ethernet | 400: acquisition module |
| 402: a first sending module | 404: a second sending module |
| 500: a first sending unit | 502: a second sending unit |

DETAILED DESCRIPTION

It should be understood that, the description such as "center", "longitudinal", "transverse", "length", "width", "thickness", "up", "down", "front", "back", "left", "right", "vertical", "horizontal", "top", "bottom", "inside", "outside", "clockwise", "counterclockwise" indicates an orientation or a position relationship based on the drawings. The above relative description is merely for the convenience of understanding and simplifying the present disclosure, and is not to indicate or imply that a device or an element must have a specific orientation and structure, or must be operated in a specific orientation. Therefore, it should not be understood as a limitation on the present disclosure.

In addition, the terms "first" and "second" are used for descriptive purposes only and cannot be understood as indicating or implying relative importance or implicitly indicating the number of technical features indicated. Therefore, a feature defined as "first" and "second" can explicitly or implicitly include one or more of the features. In the description of the present disclosure, the meaning of "plurality" and "multiple" is two or more, unless specifically defined otherwise.

In the present invention, the terms "install", "connect to", "connect with", "fix" and other terms should be understood in a broad sense unless otherwise specified and limited. For example, it may refer to fixed connections, removable connections, or integral connections. It may also refer to mechanical connections or electrical connections. It may be connected directly, or connected indirectly through an intermediate medium, or it may refer to internal communication of two elements. For those skilled in the art, the specific meanings of the above terms in the present disclosure may be understood according to specific context.

At present, a train communication network (TCN) is set on a train, so that power units on the train can interact through the TCN.

When the TCN fails and cannot work, the power units cannot communicate with each other, therefore electrical equipment on the train cannot operate normally.

Ethernet has a fast transmission speed and can transmit more information, thus, Ethernet is applied to a train control network. In technical solutions of the present disclosure, a train-level Ethernet and a train communication network are used on a train simultaneously, to make sure a mature and reliable network system applied to the train. Thus, a redundant network structure is formed by the train-level Ethernet and the train communication network, thereby enhancing stability and reliability of communication between power units of the train.

Embodiment One

Reference is made to FIG. 1, which is a schematic structural diagram of a train network control system according to an embodiment of the present disclosure. The train network control system provided in this embodiment includes at least two power units, and data interaction is performed between power units of the at least two power units through a backbone Ethernet (not shown in the figure) or a wired train bus (not shown in the figure).

A train-level network includes the wired train bus and the backbone Ethernet. A vehicle-level network includes a marshaling network and a multi-function vehicle bus.

Taking electric multiple units as an example. For example, the electric multiple units have eight compartments, with compartments 1 to 4 forming a power unit and compartments 5 to 8 forming another power unit. Information can be transmitted between the two power units through the backbone Ethernet (ETB) or the wired train bus (WTB). Information can be transmitted inside one power unit through the vehicle-level marshaling Ethernet (ECN) or the multi-function vehicle bus (MVB).

In the embodiment, ETB and ECN may form Ethernet (ETH), and WTB and MVB may form a train communication network (TCN).

When a current power unit of the train is to send a control instruction to another power unit, the current power unit is configured to execute the following steps 1 to 3:

step 1 of obtaining address information of the another power unit;

step 2 of sending a control instruction to the power unit corresponding to the address information through the backbone Ethernet based on the address information; and step 3 of sending a control instruction to the another power unit through the wired train bus in a case of not receiving feedback information from the power unit corresponding to the address information within a preset time.

In the aforementioned step 1, the address information is an IP address of the another power unit in the backbone Ethernet and the wired train bus.

In the aforementioned step 3, the preset time may be 50 milliseconds, or may be set to other values, which is not described in detail herein.

Each power unit includes a central control unit (CCU), a gateway, and a controlled device, and the power unit is configured to control the controlled device.

The central control unit is connected to the gateway, and the gateway is connected to a gateway of another power unit through the wired train bus.

The central control unit is connected to the controlled device through the marshaling Ethernet and the multi-function vehicle bus.

Controlled devices are connected with each other through the marshaling Ethernet and the multi-function vehicle bus.

The central control unit and the controlled device are connected to a central control unit and a controlled device of another power unit through the marshaling Ethernet and the backbone Ethernet connected to the marshaling Ethernet.

The central control unit is configured to send a control instruction to the controlled device through the marshaling Ethernet, and send a control instruction again to the controlled device through the multi-function vehicle bus in a case of not receiving feedback information from the controlled device within a preset time.

The controlled device refers to electrical equipment or a system host connected to the central control unit in the power unit. The central control unit controls the electrical equipment or the system host.

The system host may be a controlled device such as a traction controller, a brake controller, a door controller, and an air conditioning controller.

When the central control unit of the current power unit is to send a control instruction to the central control unit of another power unit, the central control unit of the current power unit is configured to send, based on address information of the another power unit, a control instruction to the central control unit of the power unit corresponding to the address information through the backbone Ethernet. In a case of not receiving feedback information from the power unit corresponding to the address information within the preset time, a control instruction is sent again to the power unit corresponding to the address information through the wired train bus.

According to the train network control system described above, data can be transmitted between power units of the train through the backbone Ethernet or the wired train bus. The two networks are operated simultaneously. Each power unit is preferentially controlled through the backbone Ethernet. When the backbone Ethernet fails, the wired train bus is used for data transmission. The wired train bus serves as a standby redundancy for the backbone Ethernet. Alternatively, the wired train bus may be used preferentially. When the wired train bus fails, the backbone Ethernet is used for data transmission. Thus, the train-level Ethernet serves as a standby redundancy for the train communication network.

The overall topology of the two different networks is the same. The train network control system sets the network segment according to the power unit, and address information of different devices in a power unit may be set in one network segment. Data transmission between power units is performed through the backbone Ethernet and the wired train bus. Data transmission within a power unit is performed through the marshaling Ethernet and multi-function vehicle bus. The data transmission manner of the train-level network is the same as the data transmission manner of the vehicle-level network.

A same communication protocol may be used for the Ethernet and the wired train bus for information interaction between central control units of the power units. Each central control unit preferentially uses the backbone Ethernet for information interaction. When communication between central control units through the backbone Ethernet fails, the wired train bus is used for information interaction.

The central control unit in each power unit integrates data within the power unit. The integrated data is transmitted to the backbone Ethernet connected to the central control unit of the power unit through the marshaling Ethernet, and then transmitted to other power units through the backbone Ethernet.

Controlling by the central control unit in each power unit can be realized by using relevant data according to actual situations.

Information interaction between the central control unit and the controlled device in the power unit uses Ethernet and multi-function vehicle bus communication protocols with the same content. The Ethernet uses a TRDP protocol, and other systems on the train uses TRDP and MVB protocols to perform data interaction with the central control unit.

A train including the aforementioned train network control system is further provided according to this embodiment of the present disclosure.

According to the train network control system and the train provided by this embodiment of the present disclosure, the backbone Ethernet and the wired train bus are provided on the train, data interaction between each of the power units provided on the train may be performed through the backbone Ethernet and the wired train bus. In the conventional technology, central control units of power units cannot communicate with each other when the train communication network of the train fails. However, in the present solutions, the central control units of the power units can communicate with each other through the wired train bus when the backbone Ethernet fails, and the central control units of the power units can communicate with each other through the backbone Ethernet when the wired train bus fails. The backbone Ethernet and the wired train bus form a redundant network structure, thereby enhancing stability and reliability of communication between the power units of the train.

Embodiment Two

Figure 2:
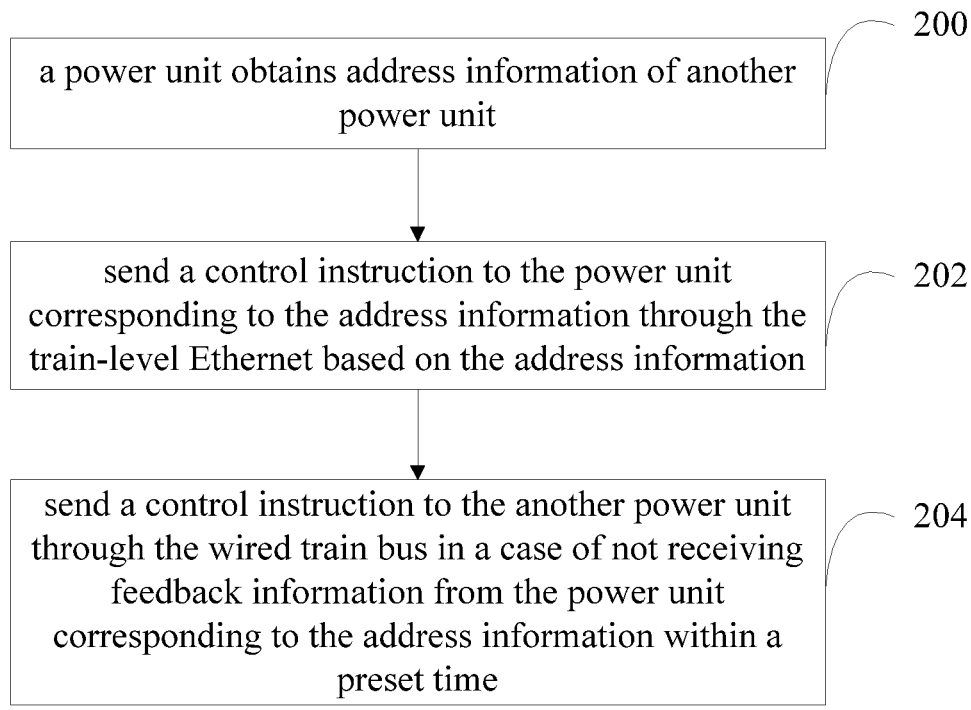
FIG. 2 is a flow chart of a train network control method according to embodiment two of the present disclosure.

Reference is made to FIG. 2, which is a flow chart of a train network control method according to an embodiment of the present disclosure, for transmission of control instruction between power units. The train network control method provided in this embodiment is applied to the aforementioned train network control system described in embodiment one, and the method includes the following steps 200, 202 and 204:

step 200 of obtaining, by a power unit, address information of another power unit;

step 202 of sending a control instruction to a power unit corresponding to the address information through the backbone Ethernet based on the address information.

step 204 of sending a control instruction to the another power unit through a wired train bus in a case of not receiving feedback information from the power unit corresponding to the address information within a preset time.

According to the train network control method provided by this embodiment, the control instruction is sent to the power unit corresponding to the address information through the backbone Ethernet. If the feedback information is not received within the preset time, the control instruction is sent to the power unit through the wired train bus. In this way, when the backbone Ethernet fails, a data transmission network is switched to the wired train bus. By sending the control instruction to the power unit through the wired train bus, it is ensured that each power unit on the train can operate normally, thereby enhancing stability and reliability of communication between power units on the train.

Embodiment Three

Figure 3:
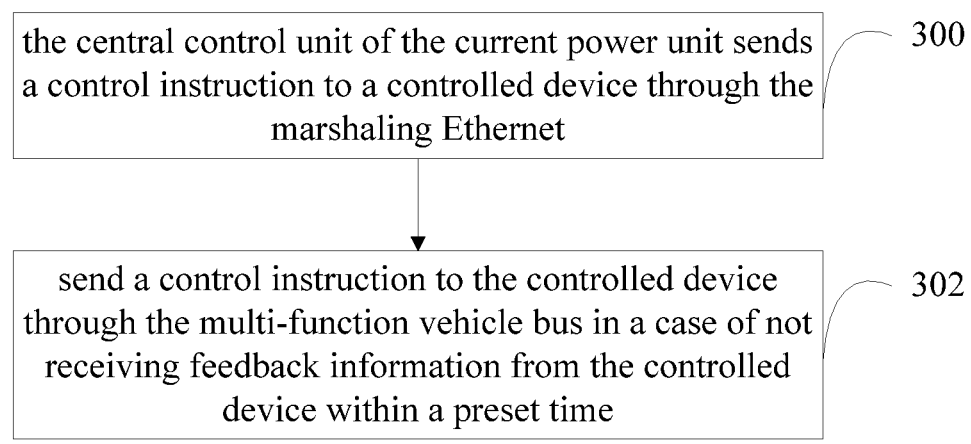
FIG. 3 is a flow chart of a train network control method according to embodiment three of the present disclosure.

Reference is made to FIG. 3, which is a flow chart of a train network control method according to an embodiment of the present disclosure, for controlling devices inside the power unit. The train network control method provided in this embodiment is applied to the aforementioned train network control system, and the method includes the following steps 300 and 302.

In step 300, the central control unit in the current power unit sends a control instruction to a controlled device through the marshaling Ethernet.

In a same network segment, the central control unit may send the control instruction to the controlled device in any conventional data transmission manner in the prior art.

In step 302, a control instruction is sent to the controlled device through the multi-function vehicle bus in a case of not receiving feedback information from the controlled device within a preset time.

When it is to send a control instruction to the central control unit of another power unit, the train network control method in this embodiment further includes the following steps (1) and (2):

step (1) of sending, based on the address information of the another power unit, a control instruction to the central control unit of the power unit corresponding to the address information through the backbone Ethernet; and step (2) of sending a control instruction to the power unit corresponding to the address information through the wired train bus in a case of not receiving feedback information from the power unit corresponding to the address information within a preset time.

According to the train network control method provided by this embodiment, the control instruction is sent to the controlled device through the marshaling Ethernet. If the feedback information is not received within the preset time, the control instruction is sent to the controlled device through the multi-function vehicle bus. In this way, when the marshaling Ethernet fails, the data transmission network is switched to be the multi-function vehicle bus. By sending the control instruction to the controlled device in the power unit through the multi-function vehicle bus, it is ensured that the controlled device in each power unit on the train may operate normally, thereby enhancing stability and reliability of communication in each power unit on the train.

Embodiment Four

Figure 4:
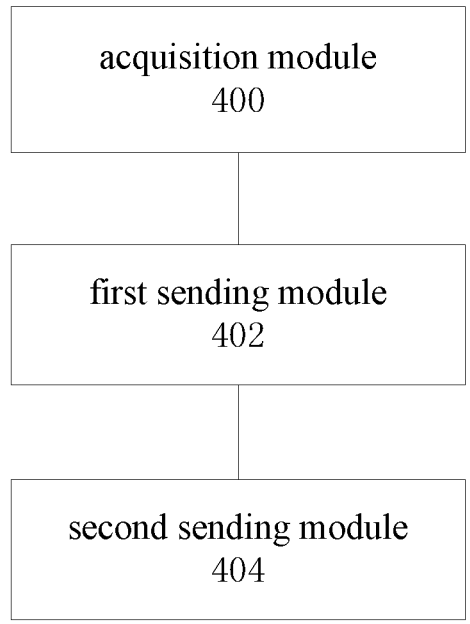
FIG. 4 is a schematic structural diagram of a train network control device according to embodiment four of the present disclosure.

Reference is made to FIG. 4, which is a schematic structural diagram of a train network control device according to an embodiment of the present disclosure. The train network control device provided in this embodiment includes:
 an acquisition module 400, configured to obtain address information of another power unit;
 a first sending module 402, configured to send a control instruction to the power unit corresponding to the address information through the backbone Ethernet based on the address information; and
 a second sending module 404, configured to send a control instruction to the another power unit through the wired train bus in a case of not receiving feedback information from the power unit corresponding to the address information within a preset time.

According to the train network control device provided by this embodiment, the control instruction is sent to the power unit corresponding to the address information through the backbone Ethernet. If the feedback information is not received within the preset time, the control instruction is sent to the another power unit through the wired train bus. In this way, when the backbone Ethernet fails, the data transmission network is switched to the wired train bus. By sending the control instruction to the another power unit through the wired train bus, it is ensured that each power unit on the train can operate normally, thereby enhancing stability and reliability of communication between power units on the train.

Embodiment Five

Figure 5:
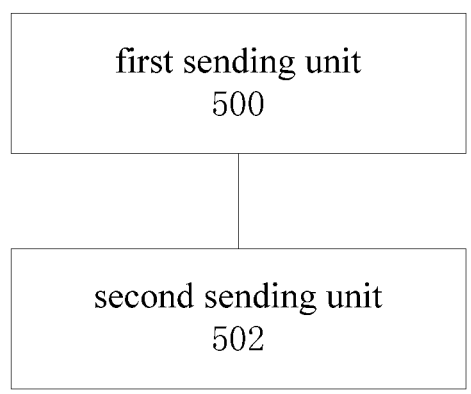
FIG. 5 is a schematic structural diagram of a train network control device according to embodiment five of the present disclosure.

Reference is made to FIG. 5, which is a schematic structural diagram of a train network control device according to an embodiment of the present disclosure. In this embodiment, the train network control device includes:
 a first sending unit 500, configured to send a control instruction to a controlled device through the marshaling Ethernet; and
 a second sending unit 502, configured to send a control instruction to the controlled device through the multi-function vehicle bus in a case of not receiving feedback information from the controlled device within a preset time.

To send a control instruction to a central control unit of another power unit, the train network control device further includes:
 a third sending unit, configured to send, based on address information of another power unit, a control instruction to the central control unit of the power unit corresponding to the address information through the backbone Ethernet when the control instruction is to be sent to the central control unit of the another power unit; and
 a fourth sending unit, configured to send a control instruction to the power unit corresponding to the address information through the wired train bus in a case of not receiving feedback information from the power unit corresponding to the address information within a preset time.

According to the train network control method provided by this embodiment, the control instruction is sent to the controlled device through the marshaling Ethernet. If the feedback information is not received within the preset time, the control instruction is sent to the controlled device through the multi-function vehicle bus. In this way, when the marshaling Ethernet fails, the data transmission network is switched to be the multi-function vehicle bus. By sending the control instruction to the controlled device in the power unit through the multi-function vehicle bus, it is ensured that the controlled device in each power unit on the train can operate normally, thereby enhancing stability and reliability of communication in each power unit on the train.

The above description are merely specific embodiments of the present disclosure, and the present disclosure is not limited to the embodiments illustrated herein. Numerous modifications and alternations can be made to the technical solutions of the present disclosure by those skilled in the art in light of the methods and technical content disclosed herein. Therefore, the scope of the present disclosure should be defined by the claims.

The invention claimed is:

1. A train network control system, comprising at least two power units,
wherein the at least two power units are connected to each other through a backbone Ethernet or a wired train bus, respectively, to achieve redundant connections, and data interaction is performed between power units of the at least two power units through the backbone Ethernet or the wired train bus,
wherein when a current power unit is to send a control instruction to another power unit, the current power unit is configured to:
obtain address information of the another power unit;
send, based on the address information, a control instruction to the power unit corresponding to the address information through the backbone Ethernet; and
in a case of not receiving feedback information from the power unit corresponding to the address information within a preset time period, send a control instruction to the another power unit through the wired train bus;
wherein a train-level network comprises the wired train bus and the backbone Ethernet, and a vehicle-level network comprises a marshaling Ethernet and a multi-function vehicle bus;
wherein the power unit comprises: a central control unit, a gateway and a system host, wherein
the central control unit is connected to the gateway, and the gateway is connected to a gateway of the another power unit through the wired train bus;
the central control unit is connected to the system host, through the marshaling Ethernet and the multi-function vehicle bus;
the system host is connected with each other through the marshaling Ethernet and the multi-function vehicle bus;
the central control unit and the system host are connected to a central control unit and a system host of the another power unit through the marshaling Ethernet and the backbone Ethernet connected with the marshaling Ethernet; and
the central control unit is configured to send a control instruction to the system host through the marshaling Ethernet, and in a case of not receiving feedback information from the system host within a preset time, send a control instruction to the system host through the multi-function vehicle bus, wherein the system host comprises a traction controller, a brake controller, a door controller, and an air conditioning controller.

2. The train network control system according to claim 1, wherein when the central control unit of the current power unit is to send a control instruction to the central control unit of the another power unit, the central control unit of the current power unit is configured to:
send, based on the address information of the another power unit, a control instruction to the central control unit of the power unit corresponding to the address information through the backbone Ethernet; and
in a case of not receiving feedback information from the power unit corresponding to the address information within a preset time, send a control instruction to the power unit corresponding to the address information through the wired train bus.

3. A train, comprising the train network control system according to claim 1.

4. A train network control method, applied to a train network control system,
wherein the train network control system comprises at least two power units;
wherein the at least two power units are connected to each other through a backbone Ethernet or a wired train bus, respectively, to achieve redundant connections, and data interaction is performed between power units of the at least two power units through a the backbone Ethernet or a the wired train bus;
wherein when a current power unit is to send a control instruction to another power unit, the current power unit is configured to:
obtain address information of the another power unit;
send, based on the address information, a control instruction to the power unit corresponding to the address information through the backbone Ethernet; and
in a case of not receiving feedback information from the power unit corresponding to the address information within a preset time period, send a control instruction to the another power unit through the wired train bus;
wherein a train-level network comprises the wired train bus and the backbone Ethernet, and a vehicle-level network comprises a marshaling Ethernet and a multi-function vehicle bus;
wherein the power unit comprises: a central control unit, a gateway and a system host, wherein
the central control unit is connected to the gateway, and the gateway is connected to a gateway of the another power unit through the wired train bus;
the central control unit is connected to the system host, through the marshaling Ethernet and the multi-function vehicle bus;
the system host is connected with each other through the marshaling Ethernet and the multi-function vehicle bus;
the central control unit and the system host are connected to a central control unit and a system host of the another power unit through the marshaling Ethernet and the backbone Ethernet connected with the marshaling Ethernet; and
the central control unit is configured to send a control instruction to the system host through the marshaling Ethernet, and in a case of not receiving feedback information from the system host within a preset time, send a control instruction to the system host through the multi-function vehicle bus, wherein the system host comprises a traction controller, a brake controller, a door controller, and an air conditioning controller;
wherein the method comprises:
obtaining, by a power unit, address information of another power unit;
sending, based on the address information, a control instruction to the power unit corresponding to the address information through the backbone Ethernet; and
in a case of not receiving feedback information from the power unit corresponding to the address information within a preset time, to the another power unit through the wired train bus.

5. A train network control method, applied to a train network control system,
wherein the train network control system comprises at least two power units;

wherein the at least two power units are connected to each other through a backbone Ethernet or a wired train bus, respectively, to achieve redundant connections, and data interaction is performed between power units of the at least two power units through a the backbone Ethernet or a the wired train bus;

wherein when a current power unit is to send a control instruction to another power unit, the current power unit is configured to:
  obtain address information of the another power unit;
  send, based on the address information, a control instruction to the power unit corresponding to the address information through the backbone Ethernet; and
  in a case of not receiving feedback information from the power unit corresponding to the address information within a preset time period, send a control instruction to the another power unit through the wired train bus;

wherein a train-level network comprises the wired train bus and the backbone Ethernet, and a vehicle-level network comprises a marshaling Ethernet and a multi-function vehicle bus;

wherein the power unit comprises: a central control unit, a gateway and a system host, wherein
  the central control unit is connected to the gateway, and the gateway is connected to a gateway of the another power unit through the wired train bus;
  the central control unit is connected to the system host, through the marshaling Ethernet and the multi-function vehicle bus;
  the system host is connected with each other through the marshaling Ethernet and the multi-function vehicle bus;
  the central control unit and the system host are connected to a central control unit and a system host of the another power unit through the marshaling Ethernet and the backbone Ethernet connected with the marshaling Ethernet; and
  the central control unit is configured to send a control instruction to the system host through the marshaling Ethernet, and in a case of not receiving feedback information from the system host within a preset time, send a control instruction to the system host through the multi-function vehicle bus, wherein the system host comprises a traction controller, a brake controller, a door controller, and an air conditioning controller;

wherein the method comprises:
sending, by a central control unit of a current power unit, a control instruction to a controlled device of the current power unit through the marshaling Ethernet; and
in a case of not receiving feedback information from the controlled device within a preset time, sending a control instruction to the controlled device of the current power unit through the multi-function vehicle bus.

6. The train network control method according to claim 5, wherein the method comprises:
when a control instruction is to be sent to a central control unit of an another power unit, sending, based on address information of the another power unit, a control instruction to the central control unit of the power unit corresponding to the address information through the backbone Ethernet; and
in a case of not receiving feedback information from the power unit corresponding to the address information within a preset time, sending a control instruction to the power unit corresponding to the address information through the wired train bus.

\* \* \* \* \*